(12) United States Patent
Riedel et al.

(10) Patent No.: US 11,414,194 B2
(45) Date of Patent: Aug. 16, 2022

(54) GALLEY MONUMENT FOR AN AIRCRAFT

(71) Applicant: Airbus Operations GmbH, Hamburg (DE)

(72) Inventors: Christian Riedel, Hamburg (DE); Falk Bajorat, Hamburg (DE); Olaf Schlatter, Hamburg (DE); Michael Bauer, Hamburg (DE)

(73) Assignee: Airbus Operations GmbH

( * ) Notice: Subject to any disclaimer, the term of this patent is extended or adjusted under 35 U.S.C. 154(b) by 490 days.

(21) Appl. No.: 16/375,126

(22) Filed: Apr. 4, 2019

(65) Prior Publication Data

US 2019/0308729 A1    Oct. 10, 2019

(30) Foreign Application Priority Data

Apr. 9, 2018   (DE) .................... 10 2018 205 267.0

(51) Int. Cl.
*B64D 11/04* (2006.01)
*B64D 11/00* (2006.01)

(52) U.S. Cl.
CPC .......... *B64D 11/04* (2013.01); *B64D 11/0007* (2013.01)

(58) Field of Classification Search
CPC . B64D 11/0015; B64D 11/04; B64D 11/0007; B64D 11/00; B64G 1/60; A47B 31/00; A47B 31/06
See application file for complete search history.

(56) References Cited

U.S. PATENT DOCUMENTS

| | | | | |
|---|---|---|---|---|
| 5,333,416 | A * | 8/1994 | Harris | B64D 11/0015 312/7.2 |
| 8,684,325 | B1 * | 4/2014 | Beshara | F16M 11/048 248/281.11 |
| 10,065,573 | B2 * | 9/2018 | Nakano | B63B 29/04 |
| 2003/0159628 | A1 | 8/2003 | Salzer et al. | |
| 2008/0116318 | A1 * | 5/2008 | Wesley | F16M 13/02 244/118.5 |
| 2008/0136299 | A1 | 6/2008 | Peurifoy | |

FOREIGN PATENT DOCUMENTS

| | | |
|---|---|---|
| DE | 20 2017 004 091 U1 | 8/2017 |
| EP | 3 153 761 A1 | 4/2017 |
| EP | 3282342 A1 | 2/2018 |
| GB | 2510765 A | 8/2014 |
| WO | 2008066722 A2 | 6/2008 |
| WO | 2014/002379 A1 | 1/2014 |

OTHER PUBLICATIONS

French Search Report for Application No. 1903646 completed on Sep. 18, 2020, 1 page.

* cited by examiner

*Primary Examiner* — Joshua J Michener
*Assistant Examiner* — Cindi M Curry
(74) *Attorney, Agent, or Firm* — Lerner, David, Littenberg, Krumholz & Mentlik, LLP

(57) ABSTRACT

A galley monument for an aircraft has a plurality of walls which define at least one slide-in compartment of the galley monument, and a display device which is coupled pivotably to one of the walls by an articulation device, wherein that wall to which the display device is coupled has a receiving recess into which the display device can be pivoted into a stowage position. Furthermore, an aircraft is described which has at least one such galley monument.

15 Claims, 3 Drawing Sheets

Detail Z:

GALLEY MONUMENT FOR AN AIRCRAFT

FIELD OF THE INVENTION

The present invention relates to a galley monument for an aircraft, and to an aircraft.

BACKGROUND OF THE INVENTION

Galleys on passenger aircraft typically comprise one or more galley monuments, i.e. individual prefabricated rack- or cupboard-like built-in assemblies, which often have a monolithic basic structure and make various functions available in an integrated way. Such galley monuments usually have slide-in compartments intended for receiving containers and/or trolleys or galley carts and/or for receiving various galley components for the preparation of meals and/or drinks. Examples of galley components include hot water boilers, coffee machines, fan-assisted ovens, hot plates, sinks, cool boxes, refrigerators and the like.

In order to make as much space as possible available for passengers, it is attempted to integrate the galley monuments in the interior of the aircraft in a manner that saves as much space as possible. In passenger aircraft in particular, however, there is also increasingly the need for service functions and monitoring functions to be available in the cabin. For example, aircraft cabins are often fitted with surveillance cameras, the recorded images of which are shown on a display, so that the flight personnel can constantly keep an eye on the passengers.

Against the background of these requirements, DE 20 2017 004 091 U1 proposes a cabin monument in the form of a combined toilet/galley unit with an integrated display, wherein the display is held pivotably on the monument in order to permit the flight personnel to orient the display.

BRIEF SUMMARY OF THE INVENTION

Aspects of the present invention may provide a galley monument in which a display device is integrated in an improved way.

According to a first aspect of the invention, a galley monument for an aircraft is provided. The galley monument has a plurality of walls which define at least one slide-in compartment of the galley monument, and a display device which is coupled pivotably to one of the walls by means of an articulation device. That wall to which the display device is coupled has a receiving recess into which the display device can be pivoted into a stowage position.

A concept on which the invention is based is that of pivotably fastening the display device to a wall, which defines a slide-in compartment, of the galley monument in such a manner that the display device can be pivoted into a recess formed in said wall. According to an embodiment of the invention, the display device is therefore coupled to such a wall which forms a side wall, a top or a bottom of the slide-in compartment, and a receiving recess for receiving the display device in the stowage position is formed in that wall to which the display device is coupled. Such a structure affords the advantage that, in the stowage position, the display device is arranged in an extremely space-saving manner and at the same time within the slide-in compartment. As a result, the slide-in compartment can be used with only very few restrictions, if any at all, for receiving containers, trolleys, galley components or similar objects. Furthermore, the display in the stowage position within the slide-in compartment is advantageously protected against adverse mechanical effects, such as shocks from impacts or blows. This effect is also reinforced by the receiving recess since the display as a result protrudes only with a very small height, if at all, over the wall. When the display device is required, the latter can be pivoted out of the receiving recess into an in-use position. A pivoting movement constitutes a movement sequence which the flight personnel can intuitively realize. The operability is therefore improved.

According to a further aspect of the invention, an aircraft with such a galley monument is provided.

According to one embodiment of the galley monument, the receiving recess is designed as a depression in an inner surface of that wall to which the display device is coupled. According thereto, the receiving recess is therefore designed as a hollow. One advantage of this configuration resides in the fact that the mechanical weakening of the wall that is associated with the formation of the receiving recess is thus kept small.

As an alternative thereto, however, the receiving recess can also be designed as a passage opening. According thereto, the receiving recess is therefore designed as a type of window or extends between a first surface of the wall and a second wall placed opposite the latter. This configuration advantageously permits pivoting of the display device in two different directions. For example, the display device can thus be accessed in each case from two adjacent slide-in compartments.

The display device is optionally coupled pivotably in the region of its centre axis to one of the walls of the galley monument. For example, the display device can be realized with a rectangular outer periphery. In this case, the centre axis corresponds to one of the axes of symmetry of the display device. A pivot axis defined by the articulation device can in particular coincide with the centre axis of the display device or can be placed at a distance therefrom, wherein the distance between the centre axis and the pivot axis is preferably at most 25% of a width, as measured perpendicularly to the centre axis, of the display device. The mounting of the display device in the region of the centre axis in particular affords the advantage that the space required by the display device in the in-use position, i.e. the distance at which the display device protrudes over the wall in the in-use position, is further reduced.

According to a further embodiment of the galley monument, the display device is coupled by a peripheral border region to one of the walls of the galley monument. The pivot axis, which is defined by the articulation device, lies here in the region of the peripheral border of the display device and can in particular coincide with said peripheral border. This affords the advantage that, in the in-use position, the display device is completely or at least for the most part pivoted out of the receiving opening, which improves the readability.

According to a further embodiment, the receiving recess is designed in such a manner that a first surface of the display device is aligned in the stowage position with an inner surface with that wall to which the display device is coupled. The first surface of the display device can be in particular a display and/or operator interface of the display device, on which information can be read in graphic form and inputs can optionally be made via a user interface. According to this embodiment, the depth of the depression therefore corresponds at least to a thickness of the display device. It is thereby avoided that the display device protrudes over the inner surface of the wall, as a result of which mechanical damage to the display device can be even more reliably avoided. Furthermore, the space required by the display device in the stowage position is thereby further reduced.

According to a further embodiment of the galley monument, the walls extend in a depth direction and define a slide-in opening of a respective slide-in compartment, wherein the receiving recess is placed in the region of the slide-in opening with respect to the depth direction. In other words, the receiving formation is therefore arranged "at the front" in the slide-in compartment. For example, the receiving opening can extend directly out of the slide-in opening. In this case, the receiving opening extends from an end surface of the wall. It can also be provided that an edge which bounds the receiving opening and is formed by the inner surface of the wall is positioned at a distance in the depth direction from the end surface of the wall, for example at a distance of between 1 mm and 10 cm. The arrangement of the receiving opening in the region of the slide-in opening facilitates access to the display device. Furthermore, in the in-use position, the display device can thereby be arranged in the vicinity of the slide-in opening or pivoted beyond the end surface of the wall. The readability from various positions in the region of the galley monument is therefore further improved.

According to one embodiment, the galley monument has a reinforcing device which is inserted into the receiving recess. The reinforcing device has, for example, a stiffening structure which at least partially extends along the periphery of the receiving recess. The mechanical rigidity of the wall in the region of the receiving recess is thereby increased. Deformations of the wall that may arise, for example, in the event of turbulent flight conditions due to shaking or shocks from impacts are thereby reduced. The probability of damage to the articulation device and the display device is thereby reduced. It is furthermore avoided that the galley monument is mechanically weakened by the receiving recess.

The reinforcing device can be designed in particular as a tray or as a frame. The frame as a reinforcing structure can extend completely or partially along the receiving recess or can define the latter. The tray has a bottom and side walls which extend transversely from the bottom. The side walls extend completely or partially along the periphery of the receiving recess. The bottom can be a closed bottom or can have recesses and can extend along the bottom of the receiving recess or can form said bottom.

According to one embodiment, the galley monument has a locking device, by means of which the display device can be arrested in the stowage position and/or in an in-use position in which the display device is pivoted out of the receiving recess. This affords the advantage that the display device can be fixed in a certain adjusted position. As a result, a position of the display device is not changed even by shaking and shocks from impacts, which is advantageous in particular during take-off and landing when the flight personnel have to sit on a seat and are intended to keep an eye on the display device in the in-use position.

According to one embodiment, the arresting device has a locking piece which is designed in a complementary manner to a locking structure formed on the display device, wherein the locking piece is movable between a locking position, in which the locking piece engages in a form-fitting manner in the locking structure of the display device, and a release position, in which the locking piece releases the locking structure of the display device. The locking piece can be designed, for example, as a lug and the locking structure can accordingly be designed as a depression. Conversely, the locking piece can also have a depression and the locking structure can have a corresponding lug. The locking piece can in particular be of cuboidal design, as a result of which the display device can in each case be arrested after a pivoting angle of 90° about the pivot axis.

The locking piece is optionally prestressed into the locking position, for example by means of a spring. As a result, inadvertent unlocking is reliably avoided.

According to one embodiment of the galley monument, power lines and/or data lines for supplying to the display device run within the articulation device between the wall to which the display device is coupled and the display device. For example, display cables can be guided through the articulation device, in a way similar to how a display cable runs through the hinge of a laptop.

According to one embodiment the galley monument has an actuator, by means of which the display device is movable between the stowage position and an in-use position in which the display device is pivoted out of the receiving recess. The actuator is kinematically coupled to the display device, for example via the articulation device. In particular, the actuator can be an electric motor which is attached to the wall or integrated in the cross section thereof. The actuator has the effect of increasing the operating convenience of the galley monument. Furthermore, the degree of automation is increased, which relieves the flight personnel and consequently also increases safety.

A display device is understood here as meaning in particular an electronic optical display, such as, for example, an LED, OLED, TFT or LCD screen or the like, with or without backlighting. In this case, the display device can also have touchscreens or the like, which in addition to information output also allow input by way of a screen serving as a touch panel.

With regard to directional indications and axes, in particular directional indications and axes relating to the profile of physical structures, a path of an axis, of a direction or of a structure "along" another axis, direction or structure is understood here as meaning that these, in particular the tangents that arise at a respective point of the structures, run in each case at an angle of less than or equal to 45°, preferably less than or equal to 30°, and particularly preferably parallel, to one another.

With regard to directional indications and axes, in particular directional indications and axes relating to the profile of physical structures, a path of an axis, of a direction or of a structure "transversely" with respect to another axis, direction or structure is understood here as meaning that these, in particular the tangents that arise at a respective point of the structures, run in each case at an angle of greater than 45°, preferably greater than 60°, and particularly preferably perpendicular, to one another.

BRIEF DESCRIPTION OF THE DRAWINGS

The invention will be explained below with reference to the figures of the drawings. In the figures.

DETAILED DESCRIPTION

Unless stated otherwise, the same reference signs are used in the figures to denote identical or functionally identical components.

Figure 1:
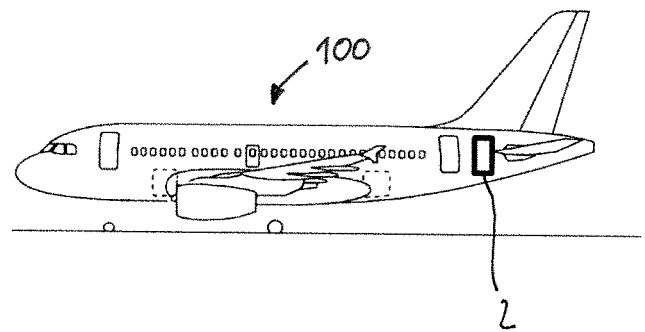
FIG. 1 shows a simplified, schematic view of an aircraft according to an exemplary embodiment of the present invention.
Figure 2:
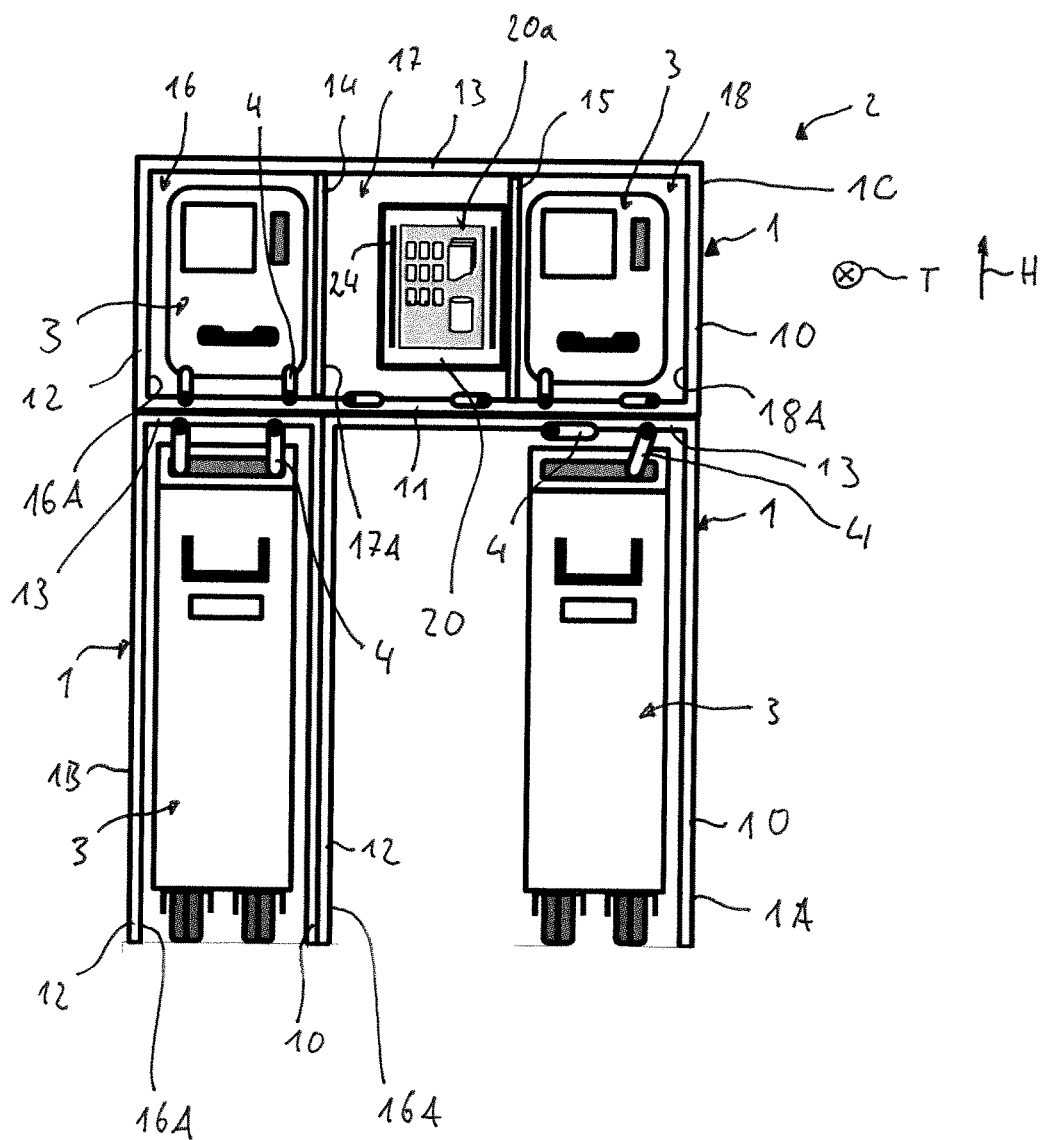
FIG. 2 shows a plan view of a front side of a galley that has a galley monument according to an exemplary embodiment of the present invention.

FIG. 2 shows a schematic front side view of a galley 2. The latter can be provided, for example, in a passenger cabin of an aircraft 100, in particular a passenger aircraft, as is illustrated by way of example in FIG. 1. As can be seen in FIG. 1, the galley 2 can be arranged, for example, in the region of the tail of the aircraft 100 close to an entrance area.

The galley 2 illustrated in FIG. 2 purely by way of example has three galley monuments 1, 1A, 1B, 1C. Each of said galley monuments 1 has one or more slide-in compartments 16, 17, 18 which are designed for receiving one or more galley components 3.

Thus, a first galley monument 1A (bottom right in FIG. 1) has a slide-in compartment 16 for receiving two galley components 3, in this case two trolleys. A second galley monument 1B (bottom left in FIG. 1), arranged alongside the first galley monument 1A, has one slide-in compartment 16 designed for just one single trolley. Arranged over these two galley monuments 1A, 1B is a third galley monument 1C, which has three slide-in compartments 16, 17, 18 each for receiving a container, as galley components 3. The slide-in compartments 16, 17, 18 can have, for example, standardized dimensions for receiving standardized containers or the like.

Purely by way of example, two catches 4 are mounted on each of the slide-in compartments 16, 17, 18 on the respective galley monument 1. Each of said catches 4 is designed to be movable between a closed position and an open position. In the closed position, a galley component 3 located in the slide-in compartment 2 is locked fast or held fast in the slide-in compartment 2 by the catch 4. In the open position, the catch releases the respective slide-in compartment 16, 17, 18 for sliding in and for removing a galley component 3. For example, at the bottom left in FIG. 1, a trolley is held in the galley monument 1 by two catches 4.

The slide-in compartments 16, 17, 18 are in each case defined by walls 10, 11, 12, 13, 14, 15 of the respective galley monument 1, said walls extending in a depth direction T of the galley monument 1. In FIG. 2, the first and second galley monuments 1A and 1B have in each case two spaced-apart side walls 10, 12 and also a top wall 13 extending between the side walls 10, 12. The third galley monument 1C comprises two spaced-apart side walls 10, 12, a top wall 13 extending between the side walls 10, 12, a bottom wall 11 extending between the side walls 10, 12, which is placed opposite the top wall 13 with respect to a vertical direction H of the galley monument 1, and also two intermediate walls 14, 15 which are spaced apart from each other and from the side walls 10, 12 and extend between the bottom wall 11 and the top wall 13. The walls 10, 11, 12, 13, 14, 15 of a respective galley monument 1A, 1B, 1C define at least one slide-in opening 16A, 17A, 18A of a respective slide-in compartment 16, 17, 18. For example, the side wall 12, the intermediate wall 14 and also the bottom wall 11 and the top wall 13 of the third galley monument 1C define a slide-in opening 16A.

In the case of the galley 2 shown by way of example in FIG. 2, the third galley monument 1C has a display device 20. The display device 20 has a first surface 20A, which is formed by a surface of a display that is designed for displaying information. In FIG. 2, this is illustrated schematically by display symbols.

The display device 20 is coupled pivotably to one of the walls 10, 11, 12, 13, 14, 15 of the galley monument 1 by means of an articulation device 30 (not illustrated in FIG. 2) and can be pivoted about a pivot axis S in particular between an in-use position and a stowage position. In FIG. 2, the display device 20 is arranged in an in-use position. In the case of the third galley monument 1C that is illustrated by way of example in FIG. 2, the display device 20 is coupled to the intermediate wall 15. Of course, the display device 20 could also be coupled to one of the side walls 10, 12 or to the top wall 13 of each of the three galley monuments 1A, 1B, 1C. It is also conceivable for the display device 20 to be coupled to the other intermediate wall 14 or to the bottom wall 11 of the third galley monument 1C.

Further details of the galley monument will be explained below with respect to FIGS. 3 to 6.

Figure 3:
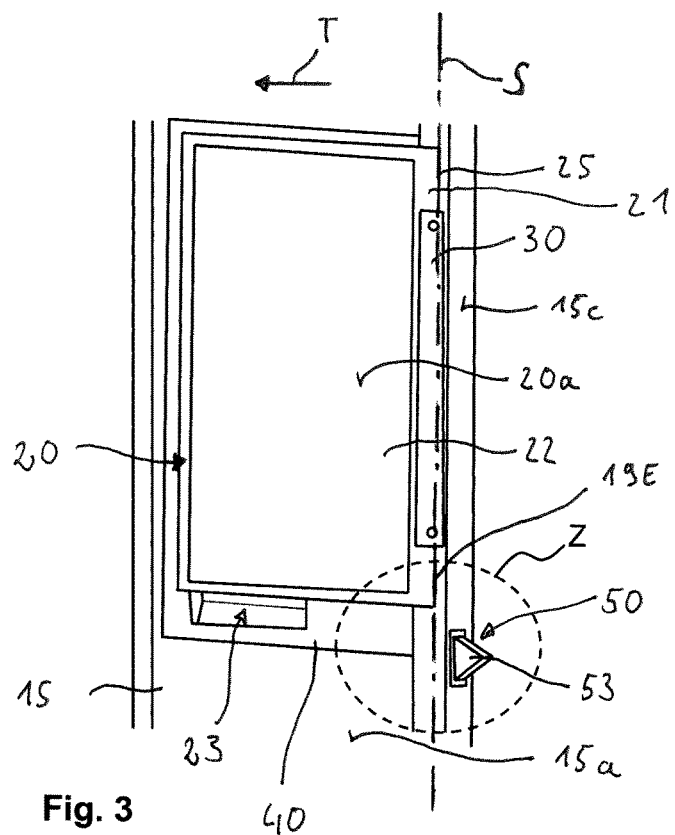
FIG. 3 shows a perspective partial view of a galley monument according to an exemplary embodiment of the present invention, wherein a display device of the galley monument is arranged in a stowage position.

FIG. 3 shows the display device 20 in a stowage position. In the stowage position, the display device 20 is arranged in a receiving recess 19 which is formed in that wall 10, 11, 12, 13, 14, 15 of the galley monument 1 to which the display device 20 is coupled. In FIG. 3, the receiving recess 19 is provided by way of example in the intermediate wall 15. The first surface 20a of the display device 20 can be positioned here in particular facing away from the receiving recess 19, as is illustrated by way of example in FIG. 3. A second surface 20b placed opposite the first surface 20a can lie here against a bottom 19A of the receiving recess 19 or can face said bottom.

Figure 5:
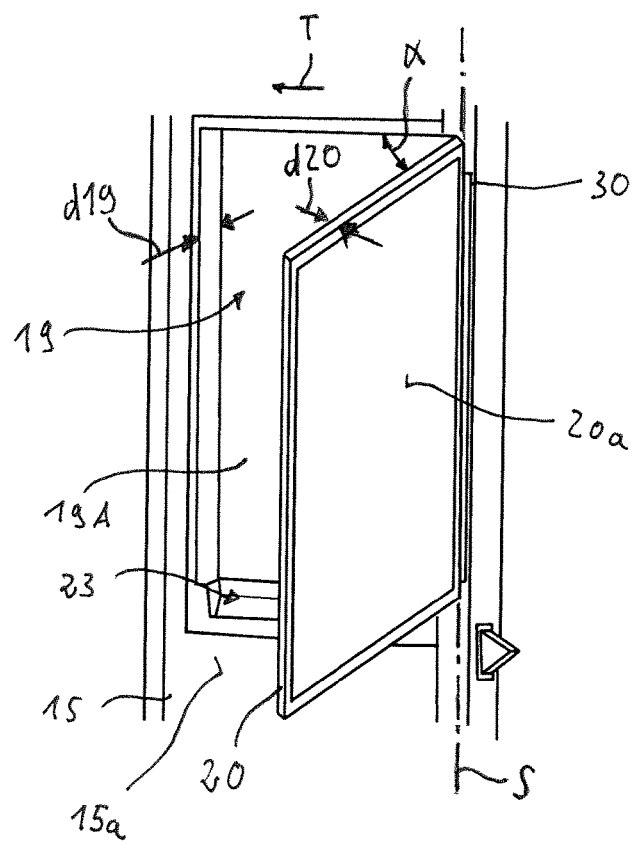
FIG. 5 shows a perspective partial view of the galley monument from FIG. 3, wherein the display device of the galley monument is arranged in an in-use position.

FIG. 5 shows the display device 20 in an in-use position. In the in-use position, the display device 20 is pivoted out of the receiving opening 19 about a pivot angle α, for example 90°, in relation to the stowage position about a pivot axis S defined by the articulation device 30.

As illustrated schematically in FIG. 3, the articulation device 30 can be formed, for example, by a hinge. Alternatively, the articulation device 30 can also be formed by first articulation parts formed on the display device 20, for example in the form of pins, and second articulation parts provided on the wall 10, 11, 12, 13, 14, 15, 16, for example in the form of bearing bushings. Power lines and/or data lines for supplying to the display device 20 can generally run within the articulation device 30 between the wall 15 to which the display device 20 is coupled and the display device 20.

As illustrated by way of example in FIGS. 3 and 5, the display device 20 can have a housing 21, which defines a peripheral border region 25 of the display device 20, and a display 22 which forms the first surface 20a and is embedded in the housing 21. The display device 20 can in particular have a rectangular configuration, as is illustrated by way of example in FIGS. 3 and 4.

The display device 20 can be coupled in particular by the peripheral border region 25 to one of the walls 10, 11, 12, 13, 14, 15, 16. This can be realized, for example as in FIGS. 3 and 5, by the articulation device 30 being coupled to the housing 21 of the display device 20.

As illustrated by way of example in FIG. 5, the receiving recess 19 can be designed in particular as a depression in an inner surface 15a of that wall 15 to which the display device 20 is coupled. As can be seen in FIG. 5, the receiving recess 19 is preferably formed in a complementary manner with respect to the outer circumference of the display device 20. The receiving recess 19 can optionally have a recessed grip 23, as is shown by way of example in FIGS. 3 and 5. The recessed grip 23 extends here out from the inner surface 15a of the wall 15 in the form of a depression in the direction of a base or bottom 19A of the receiving recess 19. This makes it easier for a user who wishes to pivot the display device 20 from the stowage position shown in FIG. 3 into the in-use position to grip the display device 20.

As can be seen in particular in FIG. 3, the receiving recess 19 is preferably placed in the region of the slide-in opening 16A, 17A, 18A with respect to the depth direction T. For this purpose, in FIG. 3, an edge 19E, which bounds the receiving opening 19 and is positioned facing the slide-in opening 16A, 17A, 18A, is spaced apart from an end surface 15c of the wall 15 in the depth direction T, for example by a distance of between 1 mm and 10 cm.

As can be seen in particular in FIG. 5, the galley monument 1 has an optional reinforcing device 40 which is inserted into the receiving recess 19. The reinforcing device 40 is illustrated by way of example as a tray in FIG. 5. In this case, the recessed grip 23 can be formed on the tray, as is shown in FIG. 5. As is illustrated by way of example in FIG. 5, provision can be made for the tray to completely cover the receiving recess 19.

Figure 4:
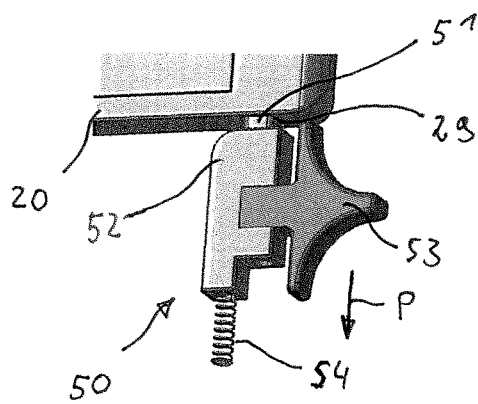
FIG. 4 shows a view of a detail of the region indicated by the letter Z in FIG. 3, as a partial view.

As is furthermore shown in FIG. 3, the galley monument 1 has an optional arresting device 50 which is illustrated in detail in FIG. 4. The arresting device 50 has at least one locking piece 51 which is arranged, for example, on a holding piece 52 and is preferably formed integrally therewith. In order to actuate the arresting device 50, the latter can have a handle piece 53 which is coupled to the locking piece 51 and projects through a recess formed in the end surface 15c of the wall 15. For the coupling to the locking piece 51, the handle piece 53 can be fastened, for example, to the holding piece 52, as is illustrated by way of example in FIG. 4.

The locking piece 51 is formed in a complementary manner with respect to a locking structure 29 formed on the display device 20. As can be seen in FIG. 4, the locking piece 51 can be in the form of a square or cuboid, and the locking structure 29 in the form of a recess 29 with a complementary cross-sectional shape. The locking structure 29 can be provided, for example integrally formed, for example on the housing 21 of the display device 20.

FIG. 4 illustrates the locking piece 51 in a locking position in which the locking piece 51 engages in a form-fitting manner in the locking structure 29 of the display device 20, for example by the locking piece 51, which is designed as a pin with a rectangular cross section, projecting into the locking structure 29, which is formed as a complementarily shaped recess 29. For unlocking the display device 20, the locking piece 41 is movable into a release position, for example by moving the handle piece 53, as is indicated by the arrow P in FIG. 4. This eliminates the form-fitting connection between the locking piece 51 and the locking structure 29 of the display device 20. In the release position, the locking piece 51 therefore releases the locking structure 29 of the display device 20, and the display device 20 can be pivoted. As is shown by way of example in FIG. 4, the locking piece 51 can be prestressed into the locking position, for example by means of a spring 54.

Another possibility of realizing the arresting device 50 would be to provide a pivotable arresting catch (not illustrated) on the inner wall 15, which arresting catch, in the stowage position of the display device 20, is pivotable into a position in which it overlaps the display device 20. In general, the display device 20 can be arrested in the stowage position and/or in the in-use position by means of the arresting device 50.

Figure 6:
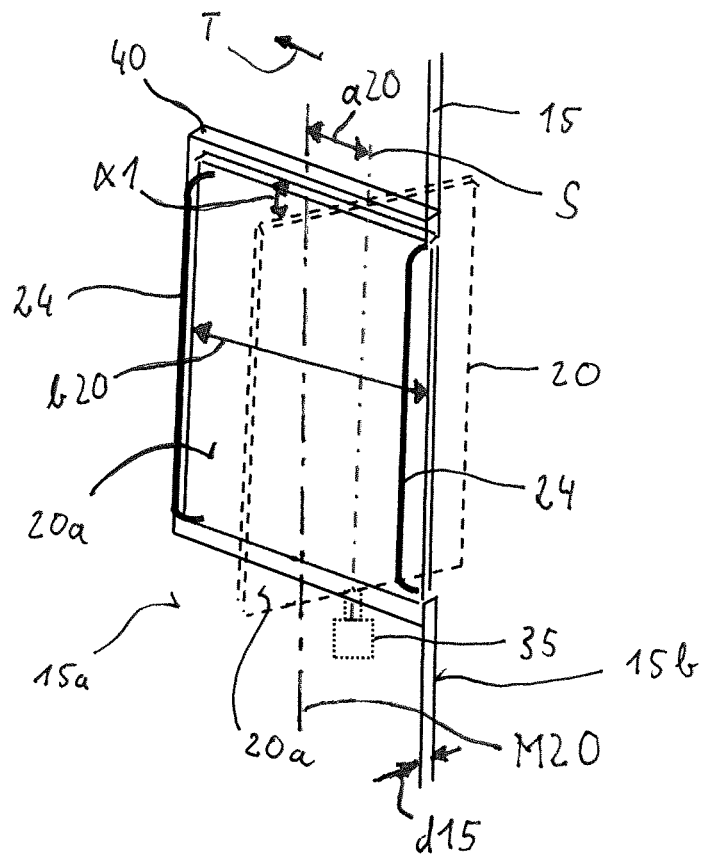
FIG. 6 shows a perspective partial view of a galley monument according to a further exemplary embodiment of the present invention, wherein a display device of the galley monument is illustrated in the stowage position as a solid line and in a first in-use position as a dashed line.
Figure 7:
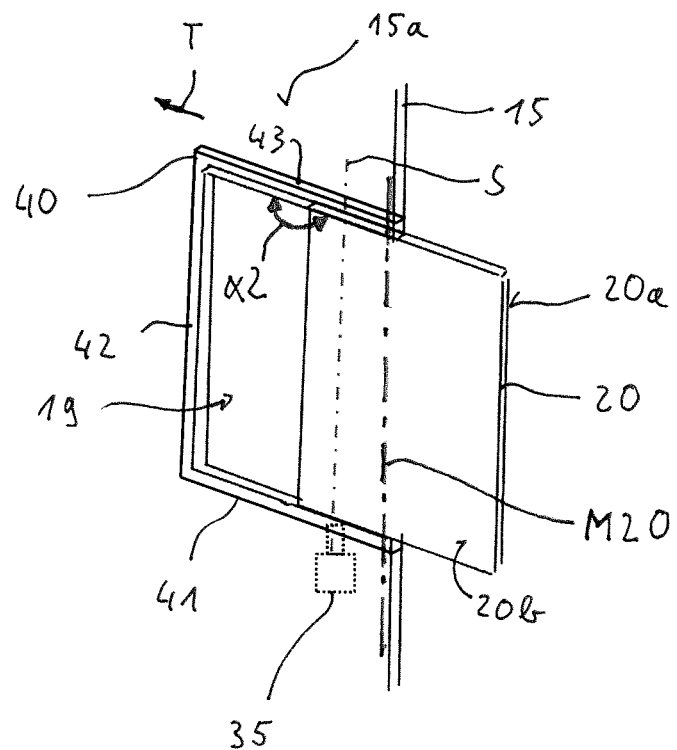
FIG. 7 shows a perspective partial view of the galley monument of FIG. 6, wherein the display device of the galley monument is arranged in a second in-use position.

FIGS. 6 and 7 illustrate a further partial view of a galley monument 1. In contrast to the galley monument illustrated in FIGS. 3 and 5, according to FIGS. 6 and 7 the receiving recess 19 is designed as a passage opening, that is to say, the receiving recess 19 extends between the inner surface 15a forming the first inner surface of the wall 15 and a second inner surface 15b placed opposite the latter.

In FIGS. 6 and 7, the display device 20 is coupled in the region of its centre axis M20 pivotably to the wall. As can be seen for example in FIG. 6, for this purpose the pivot axis S, which is defined by the articulation device 30 (not illustrated in FIGS. 6 and 7), can be arranged at a distance a20 from the centre axis M20, wherein the distance a20 here is at maximum 25% of a width b20, as measured perpendicularly to the centre axis M20, of the display device 20. Of course, the distance a20 can also be zero, with the centre axis M20 and the pivot axis S coinciding.

In FIGS. 6 and 7, the articulation device 30 (not illustrated) can be formed, for example, by first articulation parts, which are provided on the outer periphery of the display device, for example in the form of pins, and second articulation parts, which are provided on the wall 15, for example in the form of bearing bushings. Power lines and/or data lines for supplying to the display device 20 can also run here within the articulation device 30 between the wall 15 and the display device 20.

Also in the case of the galley monument 1 shown in FIGS. 6 and 7, the receiving recess 19 is placed in the region of the slide-in opening 17A with respect to the depth direction T. However, in contrast to FIGS. 3 and 5, the receiving recess 19 extends directly from the end surface 15c of the wall 15 or forms an interruption there. Of course, in the case of the galley monument 1 shown in FIGS. 5 and 6, a distance between an edge 19E of the receiving recess 19 and the end surface 15c can also be provided, as is the case in FIGS. 3 and 4.

Also in the case of the galley monument 1 shown in FIGS. 6 and 7, an optional reinforcing device 40 is provided which is inserted into the receiving recess 19, but which, in contrast to FIGS. 3 and 5, is designed as a C-shaped frame with three limbs 41, 42, 43 which extend along the periphery of the receiving recess 19.

The galley monument 1 illustrated in FIGS. 6 and 7 can likewise have an optional arresting device 50, as has been described with reference to FIGS. 3 and 4.

FIG. 6 illustrates the display device 20 by solid lines in the stowage position and by dashed lines in a first in-use position. In the in-use position, the display device 20 has been pivoted about the pivot axis S by a first pivot angle α1, for example by approximately 90°, in relation to the stowage position. FIG. 7 illustrates the display device 20 in a second in-use position in which the display device 20 is pivoted about the pivot axis S by a second pivot angle α2, for example by approximately 180°, in relation to the stowage position. If an optional arresting device 50 is provided, the display device 20 can be arrested both in the first and in the second in-use position.

Both in the case of the galley monument 1 shown in FIGS. 3 and 5 and also in the case of the galley monument 1 shown in FIGS. 6 and 7, the receiving opening 19 is optionally designed in such a manner that the first surface 20a of the display device 20 in the stowage position is aligned with the inner surface 15a of the wall 15, as is illustrated by way of example in FIGS. 3 and 6. This can be realized, for example, by the fact that the receiving recess 19 is formed at a depth d19 which is greater than or equal to a thickness d20 of the display device 20. In FIG. 6, the thickness D20 of the display device 20 here is smaller than or equal to a thickness d15 of the wall 15.

Both the galley monument 1 shown in FIGS. 3 and 5 and also that shown in FIGS. 6 and 7 can optionally have an actuator 35. For reasons of clarity, such an actuator is only illustrated in FIGS. 6 and 7 and merely symbolically there. The actuator can be, for example, an electric motor which is kinematically coupled to the display device 20 in order to pivot the latter between the stowage position and the in-use position.

As is illustrated by way of example in FIGS. 2 and 6, safety clips 24 can be attached to the display device 20. Said safety clips can in particular be provided on the border side, on the side defined by the first surface 20a of the display device 20, and therefore the first surface 20a cannot unintentionally abut during the pivoting.

Although the present invention has been explained above by way of example on the basis of exemplary embodiments, it is not restricted thereto, but instead can be modified in various ways. In particular, combinations of the foregoing exemplary embodiments are also conceivable.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE SIGNS

1 Galley monument
1A First galley monument
1B Second galley monument
1C Third galley monument
2 Galley
3 Galley components
10-15 Walls
15a First inner surface
15b Second inner surface
15c End surface
16-18 Slide-in compartment
16A, 17A, 18A Slide-in opening
19 Receiving recess
19A Bottom of the receiving recess
20 Display device
20a First surface of the display device
20b Second surface of the display device
21 Housing
22 Display
23 Recessed grip
24 Safety clip
25 Peripheral border of the display device
29 Locking structure of the display device
30 Articulation device
40 Reinforcing device
41, 42, 43 Limb
50 Arresting device
51 Locking piece of the arresting device
52 Holding piece
53 Handle piece
54 Spring
100 Aircraft
α Pivot angle
a20 Distance of the pivot axis from the centre axis
b20 Width of the display device
H Vertical direction
M20 Centre axis of the display device
P Arrow
T Depth direction
d19 Depth of the receiving recess
d20 Thickness of the display device
d15 Thickness of the wall

The invention claimed is:

1. A galley monument for an aircraft, comprising:
at least a first wall and a second wall defining at least one slide-in compartment of the galley monument; and
a display device coupled pivotably to one of the first and second walls by an articulation device, the display device having a lateral dimension,
wherein the wall to which the display device is coupled has a receiving recess into which the display device is configured to be pivoted into a stowage position,
wherein the display device is configured to pivot out of the receiving recess from the stowage position into at least one in-use position about a pivot angle of about 90°, and
wherein the first wall and the second wall are spaced apart from one another by a distance greater than the lateral dimension of the display device.

2. The galley monument according to claim 1, wherein the receiving recess is configured as a depression in an inner surface of the wall to which the display device is coupled.

3. The galley monument according to claim 1, wherein the receiving recess is configured as a passage opening.

4. The galley monument according to claim 3, wherein the display device has a centre axis and, in the region of said centre axis, is coupled pivotably to the one of the walls of the galley monument.

5. The galley monument according to claim 1, wherein the display device is coupled by a peripheral border region to the one of the walls of the galley monument.

6. The galley monument according to claim 1, wherein the receiving recess is configured in such a manner that a first surface of the display device is aligned in the stowage position with an inner surface of the wall to which the display device is coupled.

7. The galley monument according to claim 1, wherein the plurality of walls extends in a depth direction and defines a slide-in opening of the respective slide-in compartment, wherein the receiving recess is placed in the region of the slide-in opening with respect to the depth direction.

8. The galley monument according to claim 1, further comprising:
a reinforcing device inserted into the receiving recess.

9. The galley monument according to claim 8, wherein the reinforcing device is configured as a tray or as a frame.

10. The galley monument according to claim 1, further comprising:
an arresting device, by which the display device can be arrested in the stowage position and/or in an in-use position in which the display device is pivoted out of the receiving recess.

11. The galley monument according to claim 10, wherein the arresting device has a locking piece configured in a complementary manner to a locking structure formed on the display device,
wherein the locking piece is movable between a locking position, in which the locking piece engages in a form-fitting manner in the locking structure of the display device, and a release position, in which the locking piece releases the locking structure of the display device.

12. The galley monument according to claim 11, wherein the locking piece is prestressed into the locking position.

13. The galley monument according to claim 1, wherein power lines and/or data lines for supplying to the display device run within the articulation device between the wall to which the display device is coupled and the display device.

14. The galley monument according to claim 1, further comprising:
an actuator, by which the display device is movable between the stowage position and an in-use position in which the display device is pivoted out of the receiving recess.

15. An aircraft with a galley monument according to claim 1.

* * * * *